Patent Number: 5,040,937
Date of Patent: Aug. 20, 1991

Inventor: Byron L. Godbersen, Lake LaJune Estates, Ida Grove, Iowa 51445

Appl. No.: 509,310
Filed: Apr. 16, 1990

Int. Cl.⁵ ............................................. B60P 3/10
U.S. Cl. .................................. 414/559; 280/414.1
Field of Search ........... 280/47.331, 414.1, 414.2, 280/414.3; 414/479, 529, 530, 531, 532, 533, 534, 535, 536, 538, 559

[54] BOAT TRAILER AND JACK STAND WINCH ASSEMBLY

References Cited

U.S. PATENT DOCUMENTS

| | | | |
|---|---|---|---|
| 2,810,588 | 10/1957 | Rozett | 280/414.1 X |
| 2,822,100 | 2/1958 | Pesta | 414/533 X |
| 3,003,655 | 10/1961 | Bennett | |
| 3,175,710 | 3/1965 | Kistner | 414/534 |
| 4,519,738 | 5/1985 | Wood | |
| 4,802,685 | 2/1989 | Godbersen | 414/559 X |
| 4,900,051 | 2/1990 | Godbersen | |

Primary Examiner—David A. Bucci
Assistant Examiner—James W. Keenan
Attorney, Agent, or Firm—Henderson & Sturm

[57] ABSTRACT

A boat trailer having a frame with a tongue section at the front end, a pair of transversely spaced frame members at the rear end, a wheel and axle unit supporting the trailer rear end, a unit mounted on the frame for supporting a boat thereon, fore and aft and the improvement comprising a bracket mounted on the tongue section, a winch mounted on the bracket for detachable connection to the bow of the boat, and a jack stand also mounted on the bracket and movable between a position supporting the trailer front end over a ground surface, and a position aligned with and longitudinal of the tongue section.

2 Claims, 3 Drawing Sheets

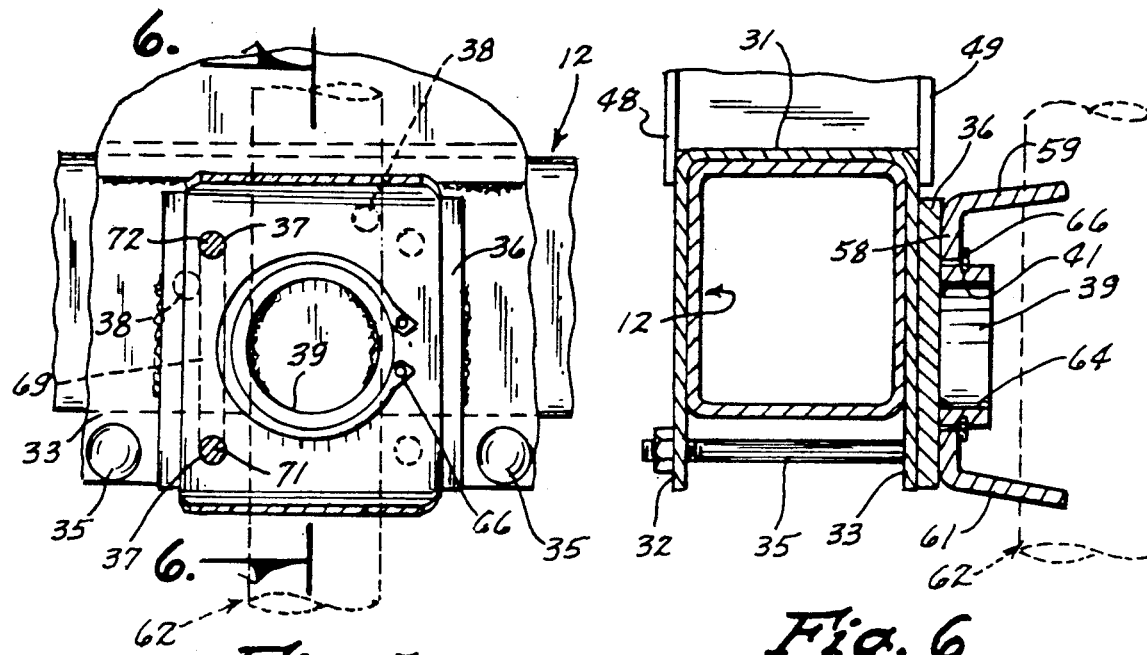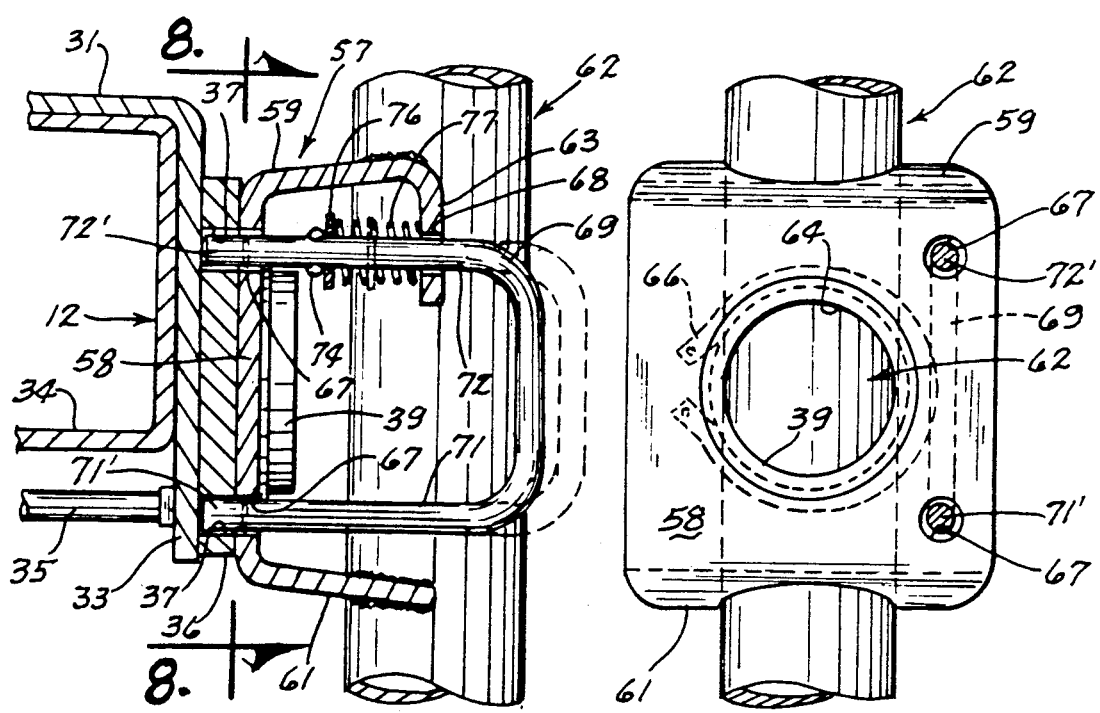

BOAT TRAILER AND JACK STAND WINCH ASSEMBLY

TECHNICAL FIELD

The present invention relates to boat trailers in general, and in particular to a wheeled trailer requiring a winch and a jack stand at the tongue area.

BACKGROUND ART

With an ever increasing number of different sized, shaped and weighted boats due to the increasing popularity of this industry, the elimination of unnecessary parts and the streamlining and integration of remaining components is uppermost in the design of modern day boat trailers.

Most boat trailers have a winch unit at the front for detachable securement of a strap with the bow eye for proper loading, transporting and unloading of the boat. Further, most boat trailers also having a jack stand mounted at the front for supporting the trailer in a position substantially level with the ground when the trailer is standing alone, the jack stand being separate from the winch unit.

DISCLOSURE OF THE INVENTION

A boat trailer is provided having a frame with a tongue section at the front end thereof, the frame including transversely spaced frame members at the rear end thereof, a wheel and axle unit supports the frame at the rear end thereof, and either bunk or roller units mounted on the frame are adapted to support a boat thereon.

The improvement comprises the combining of a winch unit and a jack stand unit by and with a common bracket unit without detracting from the respective functions of the winch unit and the jack stand unit and while retaining all of the advantages of same, the common bracket unit adapted to be adjustable longitudinally of the tongue section to adapt to any length and size boat.

It is an object of this invention to provide an improved boat trailer.

It is another object of this invention to provide a winch unit combined for operation with a jack stand unit for improving the efficiency of the trailer.

Yet another object of this invention is to provide a combined winch and jack stand assembly, thus eliminating unnecessary parts and economizing the manufacturing costs for supplying a less costly boat trailer with equal quality to the consumer.

A further object of this invention is to provide an improved boat trailer with a winch and jack stand assembly having a common bracket for mounting on the tongue, and whereby the jack stand is readily movable from an upstanding position engaged with a ground surface for supporting the trailer, to a transport position rotated into engagement and aligned with the tongue section.

BRIEF DESCRIPTION OF THE DRAWINGS

These and other attributes of the invention will become more clear upon a thorough study of the following description of a preferred embodiment of the invention, particularly when reviewed in conjunction with the accompanying drawings wherein:

FIG. 5 is a side elevational, partly sectional view taken along the line 5—5 in FIG. 4;

FIG. 6 is a sectional view taken along the line 6—6 in FIG. 5;

FIG. 7 is a vertical view taken along the line 7—7 in FIG. 2; and

FIG. 8 is a vertical view taken along the line 8—8 in FIG. 7.

BEST MODE FOR CARRYING OUT THE INVENTION

Although not intended to be so limited, for convenience of illustration, the improved boat trailer of this invention is shown in connection with a trailer for loading and supporting a low or shallow draft-type boat. The illustrated trailer construction enables the boat to be loaded directly from the water by backing the trailer down a ramp or incline and bringing the rearmost hull engaging bunk assemblies of the trailer into position close to the floating boat. The boat is then advanced into contact with the bunk assemblies and drawn forward by operation of a winch into supporting engagement with the bunk assemblies and with a forward keel supporting structure for full engagement and support of the boat for purposes of transportation.

Figure 1:
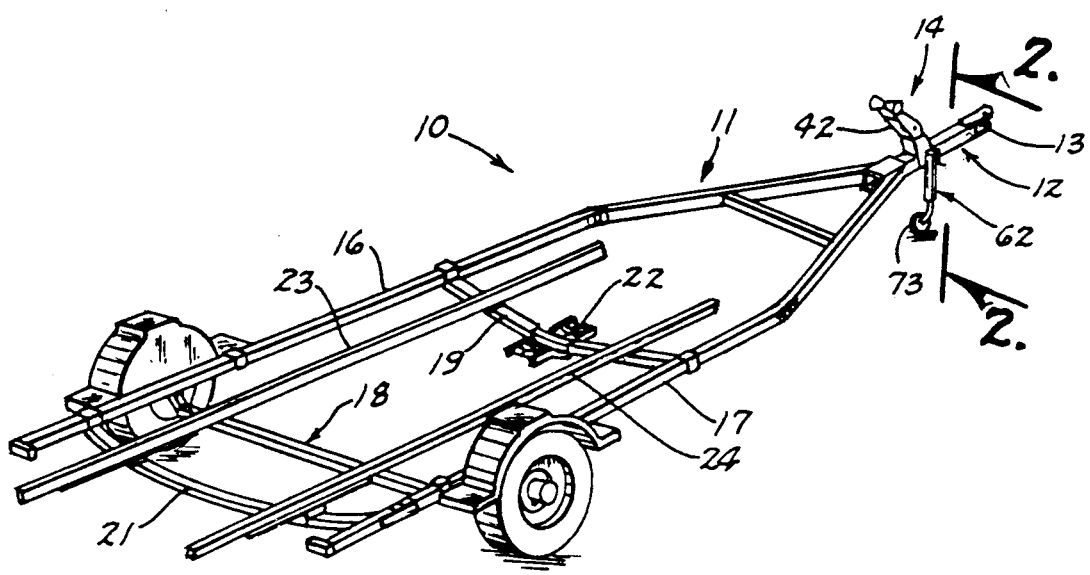
FIG. 1 is a perspective view of a boat trailer of the present invention.

Referring now to the drawings, particularly FIG. 1, the boat trailer of this invention is illustrated generally at (10) and comprises a frame assembly (11) including a tongue section (12) and hitch (13) for conventional attachment to a prime mover (not shown); a winch/jack stand assembly (14) mounted to the tongue section (12); the tongue section (12) diverging in a V-type arrangement to a pair of frame members (16) and (17) which are transversely spaced and parallel each other; a wheel and axle unit (18) being secured to the rear of the frame members (16) and (17) for supporting the rear of the trailer (10); a pair of front and rear crossbar units (19) and (21) extended to and connected between the frame members (16) and (17) fore and aft of the wheel and axle unit (18), respectively; a front keel supporting assembly (22) being mounted on the front crossbar unit; and a pair of bunk units (23) and (24) each secured in transversely spaced, parallel relation to the front and rear crossbar assemblies (19) and (21).

Figure 2:
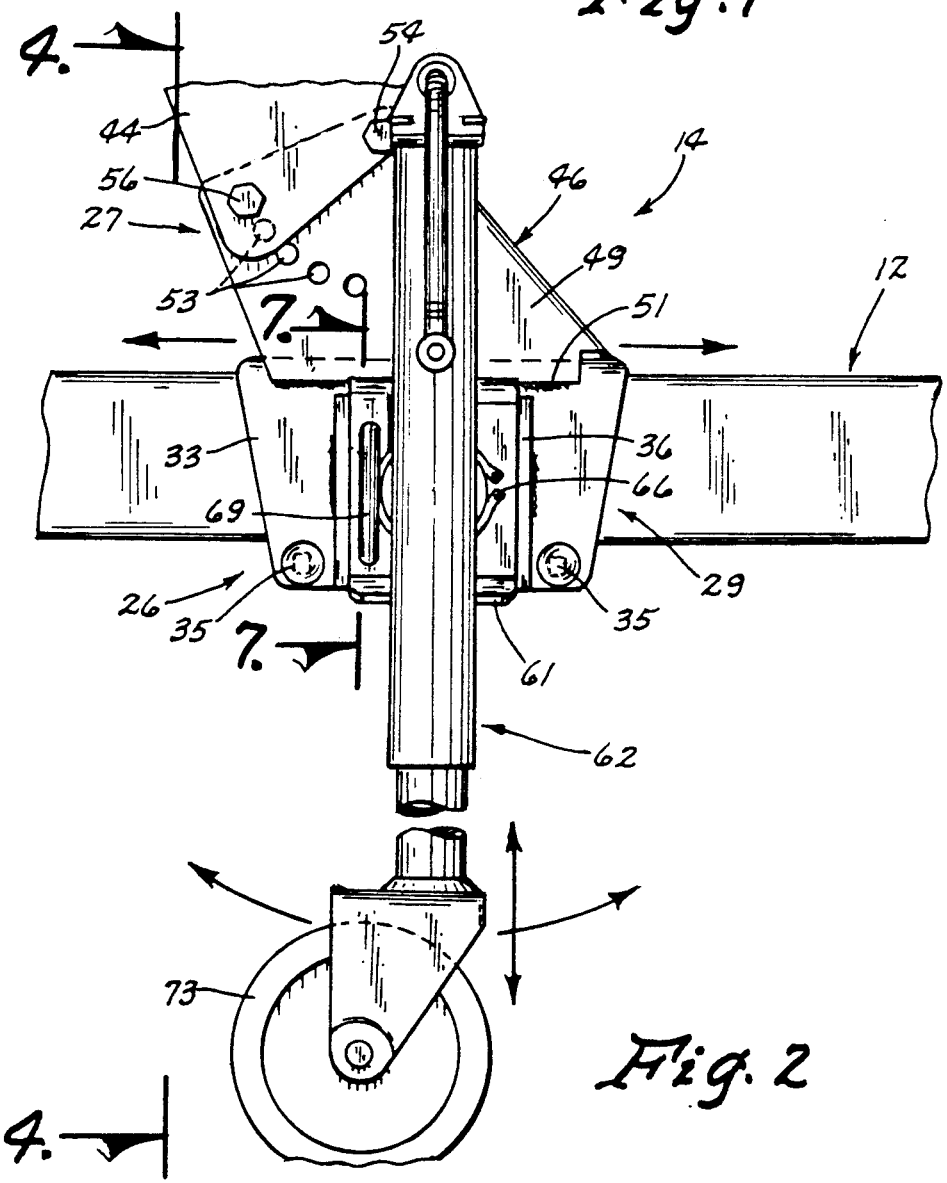
FIG. 2 is an enlarged side elevational, fragmentary view of the winch and jack stand assembly of this invention as taken along the line 2—2 in FIG. 1.

Improvement to the trailer (10) comprises generally a bracket unit (26) (FIG. 2) mounted to the tongue section (12) in an adjustable manner; a winch unit (27) (FIGS. 1 and 2) secured to the bracket unit (26) and movable therewith; and a jack unit (28) rotatably and adjustably connected to the bracket unit (26) also for movement therewith.

More particularly, and referring to FIGS. 2-7, the bracket (26) comprises a U-shaped bracket (29) having a flat base (31) and a pair of legs (32), (33) extended parallel from each end thereof; the bracket (29) adapted to be mounted in an inverted manner on the tongue section (12) in a contiguous manner therewith, and with the lower ends of the legs (32), (33) depending below the bottom (34) (FIG. 4) of the tongue section (12). To mount the bracket (29) on the tongue section (12) whereby it is movable longitudinally thereon, a pair of bolt and nut fasteners (35) are provided, being inserted through openings (not shown) formed in the legs (31), (32) at their lower, exposed ends.

Attached to one exposed side of one leg (33), for example, a flat plate (36) is secured, as by welding, the plate (36) having two pairs of sockets (37), (38) formed therein as best illustrated in FIGS. 6 and 7. One pair of sockets (37) is vertically spaced on one side of the plate (36), and the other set of sockets (38) is formed slightly offset from the horizontal across the top of the plate (36) as best shown in FIG. 5. The spacing between the sockets of each pair (37) and (38) is identical. The purpose for this will be seen hereinafter, and it is to be noted that the leg (33), for example, could be made of sufficient thickness that the pairs of sockets (37), (38) could be formed therein, obviating the plate (36). Secured to the center portion of the plate (36) is an annular pedestal (39) (FIGS. 6 and 7) with a groove (41) formed therein, again for a purpose hereinafter seen.

The winch unit (27) comprises a conventional winch (42) (FIG. 1) having a lower pair of parallel members (43), (44) (FIG. 4) adjustably mounted on another U-shaped bracket (46) having a base (47) and a pair of parallel legs (48), (49). The lower or bottom edges (51) of the legs (43), (49) are fastened to the opposed corners (52) of the lower bracket (29), whereby movement of the bracket unit (26) effects like movement of the winch unit (27). The winch (42) is adjustably mounted on the bracket (46), the latter having arcuately spaced, transversely aligned openings (53) formed therein, in that with a pivotal connection (54) between the members (43), (44) and the bracket (46) (FIG. 3), a fastener (56) may be inserted through one set of aligned openings (not shown) in the members (43), (44) when aligned with any one set of the bracket openings (53).

The jack stand unit (28) comprises a claw-like member (57) in cross section (FIG. 7) having a flat base (58) adapted to fit flush with the face of the plate (36), an upper leg (59) and a lower leg (61) both of which are secured as by welding to a conventional jack stand (62) such that the jack stand (62) extends parallel to and directly outwardly from the base (58), and with the upper leg (59) having a lip (63) (FIG. 7) depending downwardly from the outer end thereof so as to extend parallel the base (58). The base (58) has a large, circular opening (64) (FIGS. 6 and 8) formed centrally therein of a diameter slightly larger than the outer diameter of the pedestal (39) whereby the member (57) is placeable over the pedestal (39) and held in a rotatable manner like a collar against the plate (36) by a snap ring (66) being inserted in the pedestal groove (41) (FIG. 6).

Similar to the plate (36), the one side of the base (58) has a pair of openings (67) (FIG. 7) formed therein of a size and spacing substantially identical to that of the socket sets (37), (38), and with an opening (68) formed in the depending lip (63) which is horizontally aligned with the upper one of the openings (67). A U-shaped handle (69) is provided of a size such that one leg (71) extends through a lower one of the openings (67) (FIG. 7) and with an end (71') into, for example, the lower socket (37) of the vertically spaced set; with the other leg (72) extended through the lip opening (68), the upper base opening (67) and with its end (72') inserted into the upper socket (37) (FIG. 7). In this manner the jack stand (62) is held in a vertically disposed position of FIGS. 1 and 2, with the roller (73) in a ground engaging position and holding the frame assembly (11) level in combination with the wheel and axle unit (18).

Figure 3:
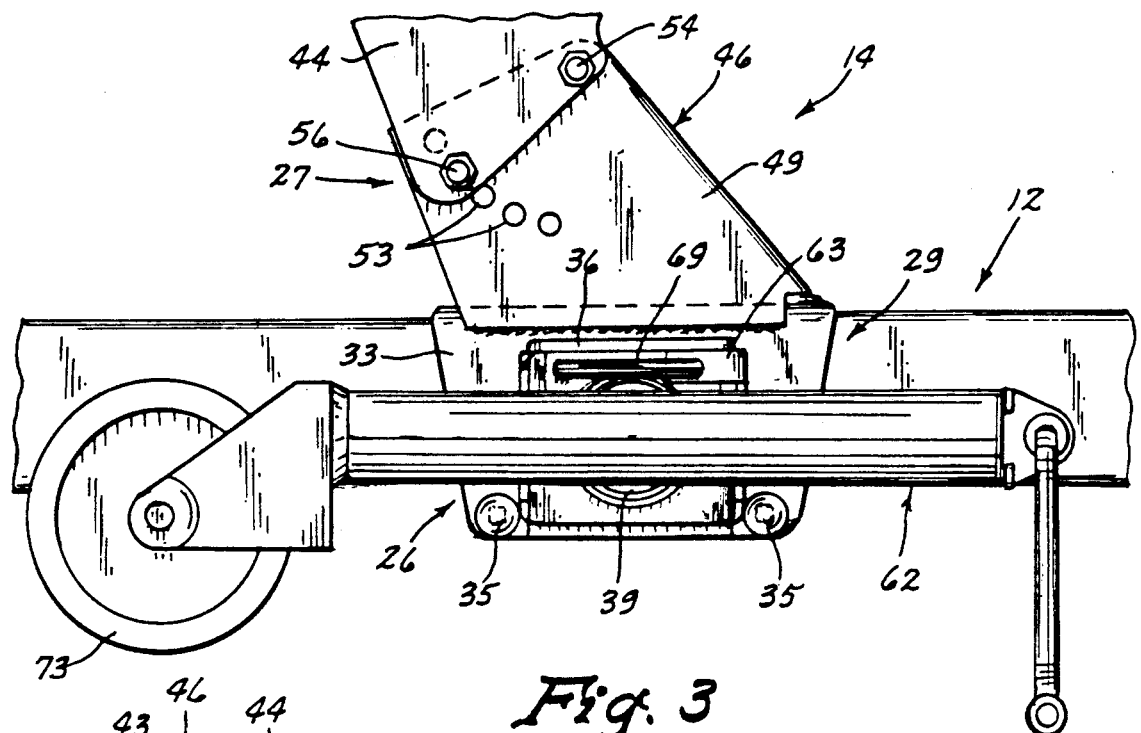
FIG. 3 is a view similar to FIG. 4, and wherein the jack stand unit has been rotated 90° to a position aligned with the tongue section of the boat trailer.
Figure 4:
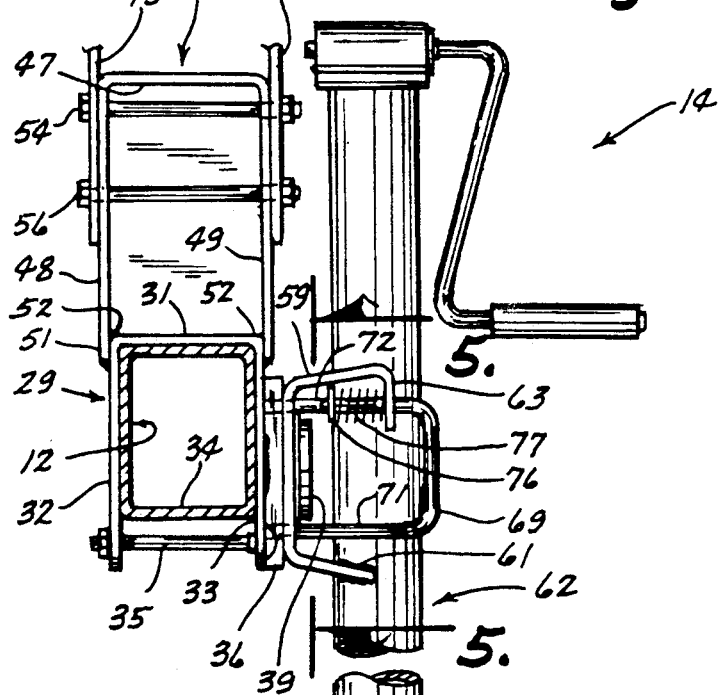
FIG. 4 is a view taken along the line 4—4 in FIG. 2.
Figure 4:
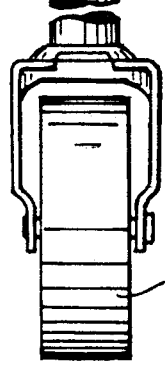

To change the position of the jack stand (62) to one wherein it extends longitudinally of and alongside the tongue section (12), about a 90° change of position, the handle (69) is pulled outwardly (FIG. 7) of the one set of sockets (37)—see the dotted line position of the handle (69), the claw member (57) rotated as a collar to a second position wherein the handle leg ends (71'), (72') are again seated in the second pair of sockets (38) such that the jack stand (62) is disposed substantially in a horizontal position (FIG. 3). To lock the handle (69) in either of these two positions, a spring biasing unit is provided (FIGS. 4 and 7) comprising a stop member (74) formed on the upper handle leg (72) intermediate its length, a washer (76) mounted on the leg (72), and a spring (77) mounted under compression between the lip (63) and the washer (76). The handle (69) of course is movable outwardly against the bias of the spring (77) from one position to the other, rotating in kind the claw member (57) and the jack stand (62).

I claim:

1. In a boat trailer having a frame with a tongue section at the front end, the frame including transversely spaced frame members at the rear end, a wheel and axle unit supporting the frame rear end, and means mounted on the frame for supporting a boat thereon, the improvement comprising:

bracket means mounted on the tongue section;

winch means mounted on said bracket means for detachable connection to a bow of the boat;

jack stand means mounted on said bracket means for supporting the frame in a position substantially level with a ground surface, in combination with the support of the frame by the wheel and axle unit;

and further wherein said bracket means is adjustably mounted on the tongue section for longitudinal movement thereon;

and further wherein said bracket means comprises a U-shaped bracket a base of which is mounted on top of the tongue section and including legs of which embrace either side of the tongue section;

and further wherein said jack stand means ia adjustably mounted on said bracket means and movable from a first upright position engageable with the ground surface, to a second position extending longitudinally of and alongside the tongue section; and and further wherein said jack stand means includes an annular pedestal secured to one of said legs and extended outwardly from the tongue section, and includes further a collar member rotatably mounted on said pedestal, wherein one of said legs includes a pair of sockets formed therein, said jack stand means including further a U-shaped handle adapted to a position to engage said collar and seat in said sockets whereby to hold said collar in a predetermined position relative to said bracket means leg.

2. The improvement of claim 1, and further wherein spring means is provided for biasing said handle into said position, said handle movable out of said position against the bias of said spring means.

* * * * *